US009251985B2

(12) United States Patent
Garascia et al.

(10) Patent No.: US 9,251,985 B2
(45) Date of Patent: Feb. 2, 2016

(54) FUSE LOCK-OUT ASSEMBLY FOR A BATTERY PACK

(71) Applicant: LG Chem, Ltd., Seoul (KR)

(72) Inventors: Michael Garascia, Waterford, MI (US); Gary Nivelt, Clarkston, MI (US)

(73) Assignee: LG Chem, Ltd., Seoul (KR)

( * ) Notice: Subject to any disclaimer, the term of this patent is extended or adjusted under 35 U.S.C. 154(b) by 250 days.

(21) Appl. No.: 14/011,428

(22) Filed: Aug. 27, 2013

(65) Prior Publication Data

US 2015/0042442 A1 Feb. 12, 2015

Related U.S. Application Data

(60) Provisional application No. 61/863,587, filed on Aug. 8, 2013.

(51) Int. Cl.
*H01H 85/22* (2006.01)
*H01H 85/54* (2006.01)
*H01H 85/20* (2006.01)
(Continued)

(52) U.S. Cl.
CPC ........... *H01H 85/22* (2013.01); *H01H 85/2015* (2013.01); *H01H 85/2045* (2013.01); *H01H 85/24* (2013.01); *H01H 85/547* (2013.01); *H01R 13/68* (2013.01); *B60L 3/00* (2013.01); *H01H 2085/208* (2013.01)

(58) Field of Classification Search
CPC ............ H01H 85/547; H01H 85/2045; H01H 85/2015; H01H 85/24; H01H 85/22; H01H 2085/208; H01R 13/68; B60L 3/00

USPC .......... 337/194, 196, 201, 205, 211; 361/626, 361/646, 837; 439/620.3
See application file for complete search history.

(56) References Cited

U.S. PATENT DOCUMENTS 1,966,716 A 7/1934 Green
2,072,729 A * 3/1937 Corbett .......................... 337/196
(Continued)

FOREIGN PATENT DOCUMENTS

JP 9306302 A 11/1997
JP 2000251611 A 9/2000
(Continued)

OTHER PUBLICATIONS

International Search Report for International application No. PCT/KR2010/002332 dated Oct. 29, 2010.

*Primary Examiner* — Anatoly Vortman
(74) *Attorney, Agent, or Firm* — Buckert Patent & Trademark Law Firm, PC; John F. Buckert

(57) ABSTRACT

A fuse lock-out assembly for a battery pack is provided. The assembly includes a first housing having an interior region holding a manual service disconnect lower housing and a manual service disconnect upper housing therein. The assembly further includes a fuse holding housing coupled to the first housing that has a first fuse compartment holding a first fuse therein. The assembly further includes a slidable door that slides from a first operational position to a second operational position. The slidable door covers an open end of the first fuse compartment at the first operational position, and extends over a portion of the manual service disconnect lower housing at the second operational position only if the manual service disconnect upper housing is previously de-coupled from the lower housing.

15 Claims, 19 Drawing Sheets

(51) Int. Cl.
  *H01H 85/24* (2006.01)
  *H01R 13/68* (2011.01)
  *B60L 3/00* (2006.01)

(56) References Cited

U.S. PATENT DOCUMENTS

| | | | | |
|---|---|---|---|---|
| 2,186,813 | A * | 1/1940 | Frederick et al. | 337/210 |
| D298,123 | S | 10/1988 | Beard | |
| 4,778,959 | A * | 10/1988 | Sabatella et al. | 218/1 |
| 4,966,561 | A | 10/1990 | Norden | |
| 5,186,637 | A * | 2/1993 | Norden | 439/133 |
| 5,556,305 | A | 9/1996 | Naegelin | |
| 5,700,165 | A * | 12/1997 | Harris et al. | 439/620.26 |
| 5,831,228 | A | 11/1998 | Kuki et al. | |
| 5,841,337 | A | 11/1998 | Douglass | |
| 5,842,560 | A | 12/1998 | Kuki et al. | |
| 5,847,338 | A | 12/1998 | Kuki et al. | |
| 5,963,420 | A * | 10/1999 | Bailey et al. | 361/616 |
| 5,973,418 | A * | 10/1999 | Ciesielka et al. | 307/130 |
| 6,054,915 | A | 4/2000 | Rowton et al. | |
| 6,157,287 | A | 12/2000 | Douglass et al. | |
| 6,333,845 | B1 | 12/2001 | Hashizawa et al. | |
| 6,366,449 | B1 | 4/2002 | Hashizawa et al. | |
| 6,407,656 | B1 | 6/2002 | Konda et al. | |
| 6,456,187 | B2 | 9/2002 | Konda et al. | |
| 6,459,353 | B1 | 10/2002 | Mattlar et al. | |
| 6,459,354 | B2 | 10/2002 | Konda et al. | |
| 6,459,558 | B1 * | 10/2002 | Hashizawa et al. | 361/104 |
| 6,531,948 | B1 | 3/2003 | Mennell | |
| 6,587,028 | B2 | 7/2003 | Mollet et al. | |
| 6,650,222 | B2 * | 11/2003 | Darr et al. | 337/187 |
| 6,784,783 | B2 | 8/2004 | Scoggin et al. | |
| 6,853,289 | B2 | 2/2005 | Scoggin | |
| 7,304,453 | B2 | 12/2007 | Eaves | |
| 7,355,503 | B2 | 4/2008 | Buettner | |
| 7,740,504 | B2 * | 6/2010 | Chikamatsu et al. | 439/620.3 |
| 7,750,789 | B2 | 7/2010 | Titokis et al. | |
| 7,893,809 | B2 | 2/2011 | Head | |
| 7,932,804 | B2 | 4/2011 | Buettner | |
| 7,948,353 | B2 | 5/2011 | Deno et al. | |
| 7,982,578 | B2 | 7/2011 | Buettner | |
| 7,985,098 | B2 * | 7/2011 | De Chazal et al. | 439/620.31 |
| 8,098,126 | B2 | 1/2012 | Niedzwiecki et al. | |
| 8,221,165 | B2 * | 7/2012 | DeWitte | 439/620.26 |
| 8,288,031 | B1 | 10/2012 | Matejek et al. | |
| 8,562,368 | B2 * | 10/2013 | Boyer | 439/345 |
| 8,597,049 | B2 * | 12/2013 | von zur Muehlen | 439/532 |
| 8,614,619 | B2 * | 12/2013 | Levi | 337/214 |
| 9,011,180 | B2 * | 4/2015 | Sharaf et al. | 439/620.3 |
| 2003/0207618 | A1 * | 11/2003 | Chen | 439/622 |
| 2005/0098419 | A1 | 5/2005 | Matsui et al. | |
| 2005/0128045 | A1 * | 6/2005 | Lin | 337/186 |
| 2006/0019541 | A1 * | 1/2006 | Maguire et al. | 439/621 |
| 2008/0185276 | A1 * | 8/2008 | Matsunaga et al. | 200/335 |
| 2008/0242150 | A1 | 10/2008 | Chikamatsu et al. | |
| 2014/0118103 | A1 * | 5/2014 | Boyer | 337/194 |
| 2014/0187071 | A1 * | 7/2014 | Rule-Greet et al. | 439/304 |
| 2014/0193990 | A1 * | 7/2014 | Zhao et al. | 439/160 |

FOREIGN PATENT DOCUMENTS

| | | |
|---|---|---|
| JP | 2000311576 A | 11/2000 |
| JP | 2007103238 A | 4/2007 |
| JP | 2007250386 A | 9/2007 |
| JP | 2009037778 A | 2/2009 |

\* cited by examiner

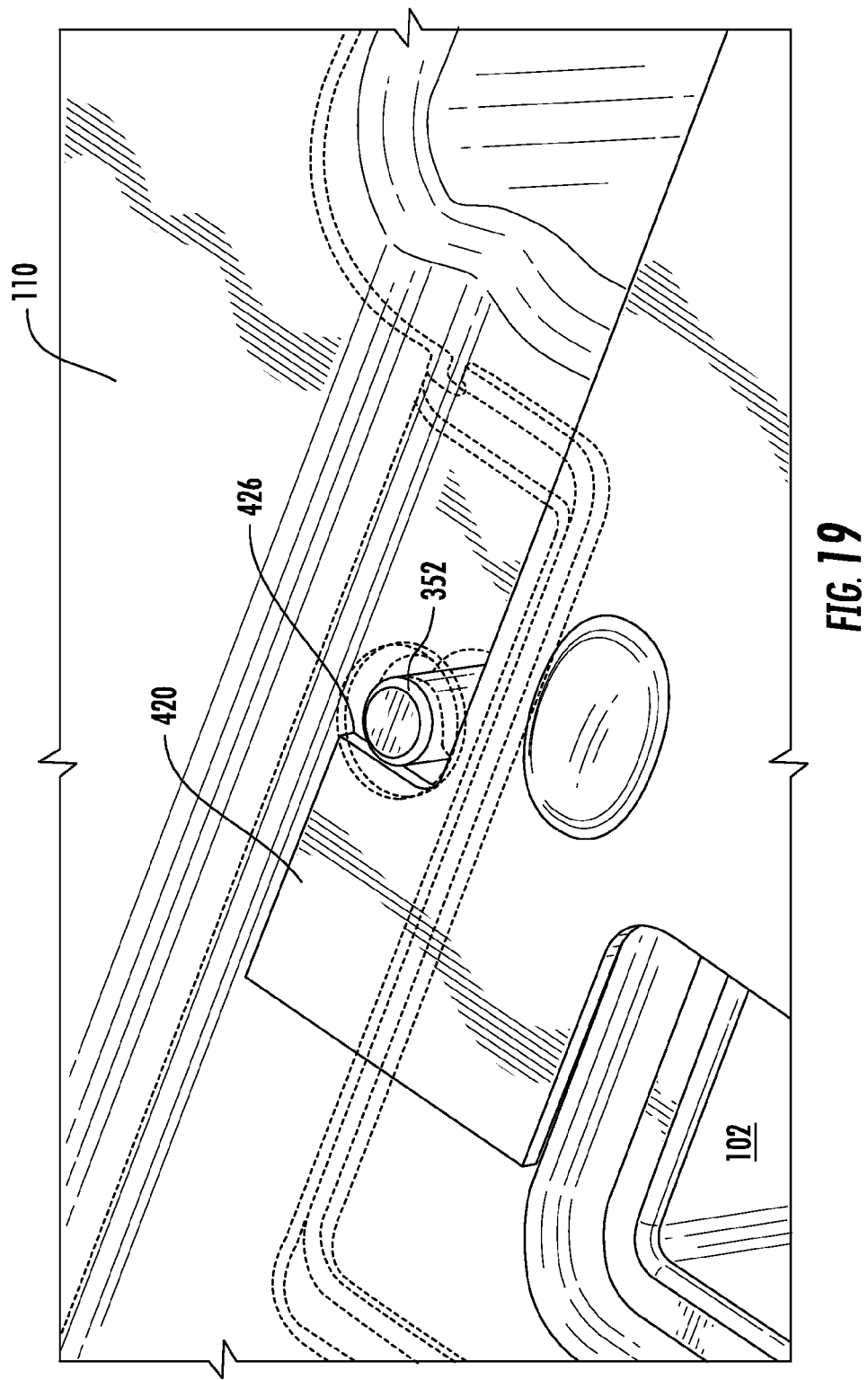

FUSE LOCK-OUT ASSEMBLY FOR A BATTERY PACK

CROSS-REFERENCE TO RELATED APPLICATIONS

This application claims priority to U.S. Provisional Patent Application No. 61/863,587 filed on Aug. 8, 2013, the entire contents of which are hereby incorporated by reference herein.

BACKGROUND

The inventors herein have recognized a need for a battery pack that prevents access to battery pack fuses when a manual service disconnect is electrically coupling battery modules together within the battery pack.

SUMMARY

A fuse lock-out assembly for a battery pack in accordance with an exemplary embodiment is provided. The fuse lock-out assembly includes a first housing having an interior region configured to hold a manual service disconnect lower housing and a manual service disconnect upper housing therein. The fuse lock-out assembly further includes a fuse holding housing coupled to the first housing. The fuse holding housing has a first fuse compartment configured to hold a first fuse therein. The fuse lock-out assembly further includes a slidable door slidably coupled to the first housing. The slidable door is configured to slide from a first operational position to a second operational position. The slidable door is configured to cover an open end of the first fuse compartment at the first operational position to prevent the first fuse from being removed from the first fuse compartment. The slidable door is further configured to extend over a portion of the manual service disconnect lower housing at the second operational position only if the manual service disconnect upper housing is previously de-coupled from the manual service disconnect lower housing. The slidable door is further configured to not cover the open end of the first fuse compartment at the second operational position.

BRIEF DESCRIPTION OF THE DRAWINGS

FIG. 19 is an enlarged schematic of a portion of the fuse lock-out assembly of FIG. 2 having a second stopping member configured to stop movement of the slidable door at the second operational position.

DETAILED DESCRIPTION

Figure 1:
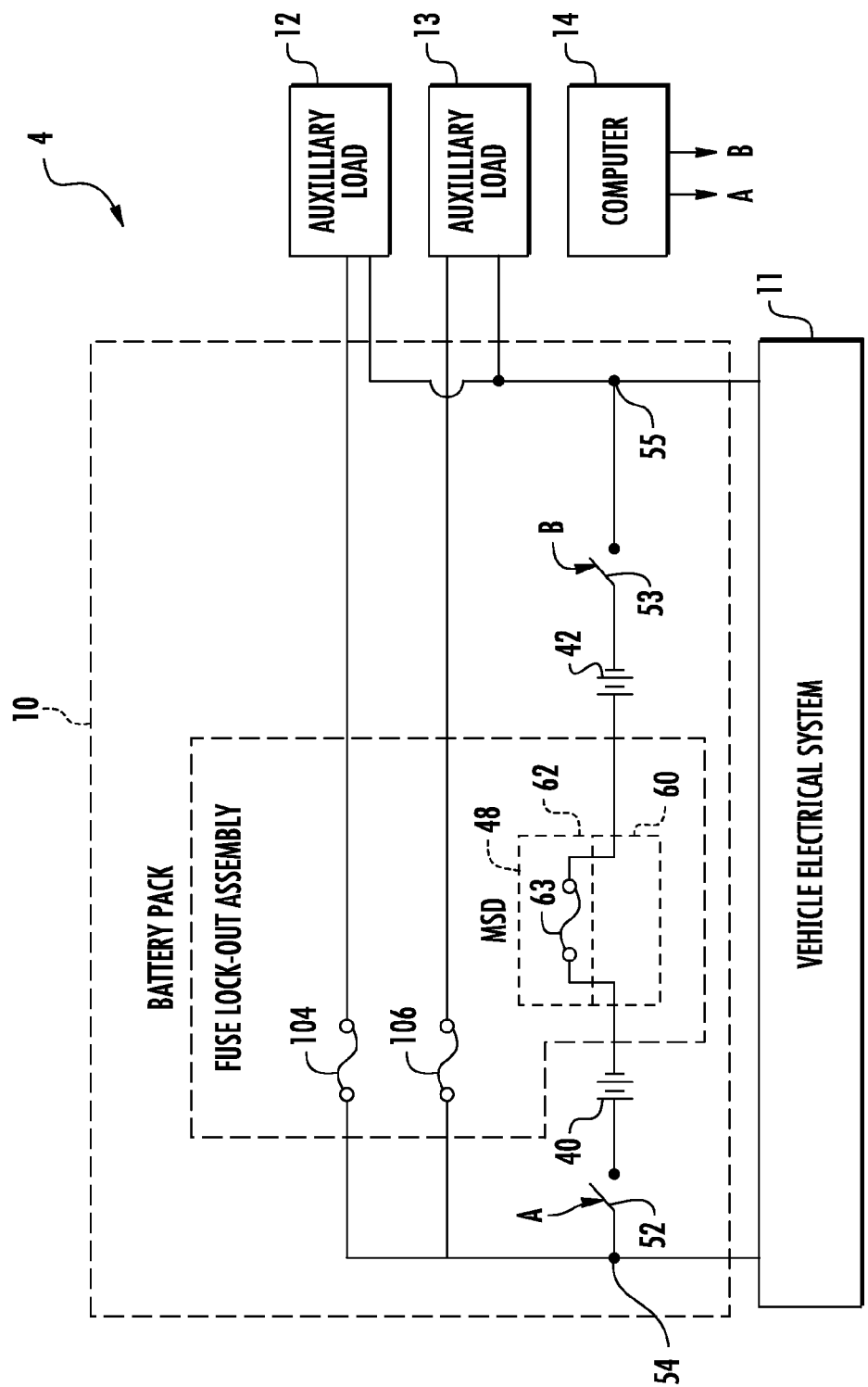
FIG. 1 is a schematic of an electrical vehicle having a battery pack with a fuse lock-out assembly in accordance with an exemplary embodiment.
Figure 2:
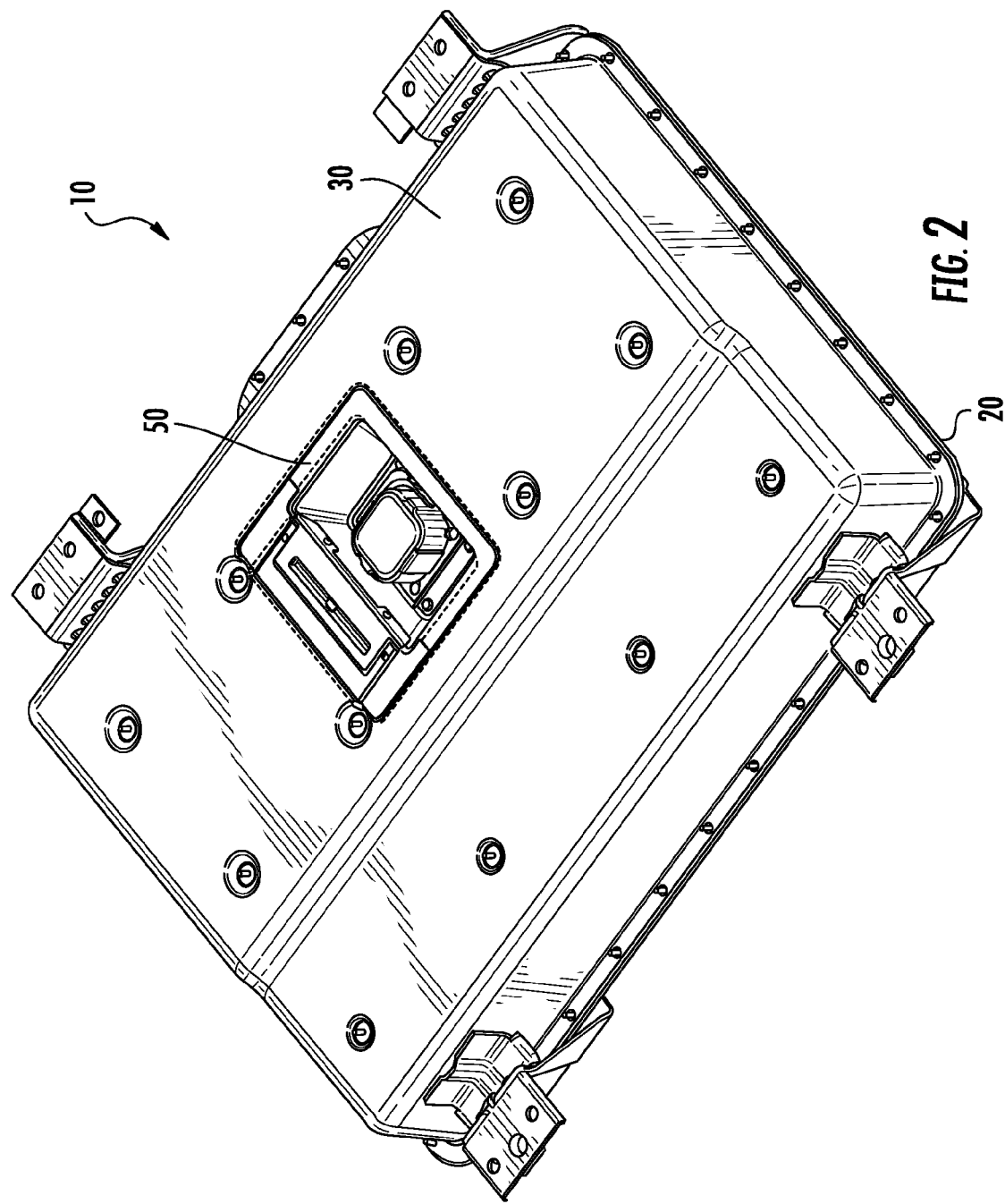
FIG. 2 is a schematic of the battery pack having a fuse lock-out assembly in accordance with an exemplary embodiment.

Referring to FIGS. 1 and 2, an electric vehicle 4 is illustrated. The electric vehicle 4 includes a battery pack 10, a vehicle electrical system 11, auxiliary loads 12, 13, and a computer 14.

Referring to FIGS. 1-5, the battery pack 10 in accordance with an exemplary embodiment provides electrical power to the vehicle electrical system 11, and the auxiliary loads 12, 13. The battery pack 10 includes a lower housing portion 20, an upper housing portion 30, battery modules 40, 42, a manual service disconnect 48, contactors 52, 53, and a fuse lock-out assembly 50 in accordance with an exemplary embodiment. An advantage of the battery pack 10 is the battery pack 10 utilizes the fuse lock-out assembly 50 with a slidable door 120 (shown in FIG. 4) that prevents access to fuse compartments unless an upper housing 62 of the manual service disconnect 48 is removed from the fuse lock-out assembly 50. For purposes of understanding, a fuse is "accessible" if the fuse can be removed from a fuse compartment by an operator or disposed into the fuse compartment by the operator.

Referring to FIG. 1, the contactor 52 is electrically coupled between the node 54 and the battery module 40. Further, the battery module 40 is electrically coupled in series between the contactor 52 and the fuse 63 of the manual service disconnect 48. Also, the battery module 42 is electrically coupled between the fuse 63 of the manual service disconnect 48 and the contactor 53. The contactor 53 is electrically coupled in series between the battery module 42 and the node 55. The vehicle electrical system 11 is electrically coupled between the nodes 54, 55. When the contactors 52, 53 have a closed operational position in response to control signals from the computer 14, and the fuse 63 has a non-blown state and is in series with the battery modules 40, 42, an operational voltage from the battery modules 40, 42 is applied to the vehicle electrical system 11. Also, when the contactors 52, 53 have a closed operational position in response to control signals from the computer 14, and the fuses 104, 106 each have a non-blown state, an operational voltage from the battery modules 40, 42 is applied to the auxiliary loads 12, 13.

It is noted that if the manual service disconnect upper housing 62 having the fuse 63 is removed from the battery pack 10 by an operator, the operational voltage supplied by the battery modules 40, 42 to a load is reduced by one-half.

Referring to FIGS. 1 and 2, the upper housing portion 30 is configured to be coupled to the lower housing portion 20. The lower housing portion 20 is configured to hold the battery modules 40, 42 and the fuse lock-out assembly 50 thereon. The upper housing portion 30 and the lower housing portion 20 define an interior region configured to hold the battery modules 40, 42 therein. The upper housing portion 30 has an aperture extending therethrough in which a portion of the fuse lock-out assembly 50 extends therethrough. In one exemplary embodiment, the upper housing portion 30 and the lower housing portion 20 are constructed of steel. Of course, in an alternative embodiment, the upper housing portion 30 and the lower housing portion 20 could be constructed of other materials such as aluminum or plastic for example.

Referring to FIG. 1, the battery modules 40, 42 are configured to be electrically coupled in series with the fuse 63 of the manual service disconnect 48 and the contactors 52, 53. In one exemplary embodiment, the battery modules 40, 42 are lithium-ion battery modules. Of course, in an alternative embodiment, the battery modules 40, 42 could be other battery modules such as nickel-metal hydride battery modules for example.

Figure 3:
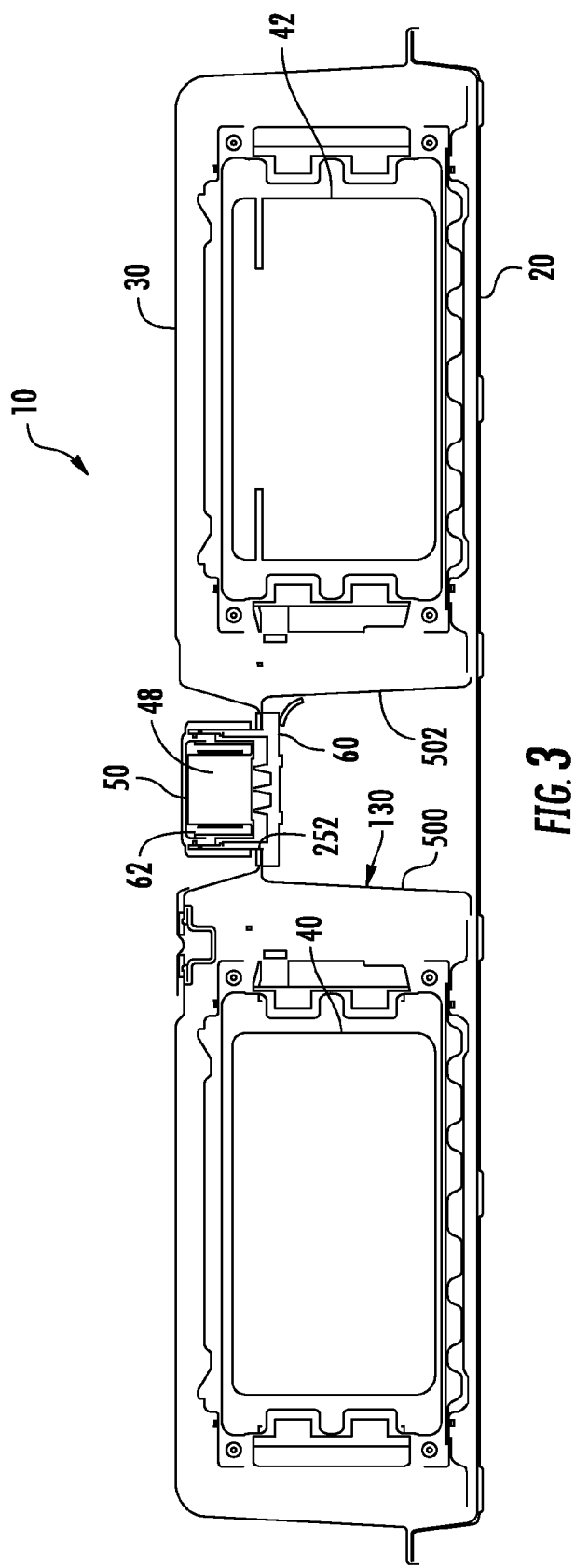
FIG. 3 is a cross-sectional schematic of the battery pack of FIG. 2.

Referring to FIGS. 1-3, the manual service disconnect 48 is configured to selectively electrically to couple the battery modules 40, 42 to each other, and to electrically de-couple the battery modules 40, 42 from each other as described in greater detail below. The manual service disconnect assembly 48 has the manual service disconnect lower housing 60, the manual service disconnect upper housing 62, and the fuse 63 disposed in the upper housing 62. The upper housing 62 is configured to be removably coupled to the lower housing 60. A portion of the lower housing 60 (shown in FIG. 6) is disposed through a central aperture 252 (shown in FIG. 11) of the housing 100. The lower housing 60 is coupled to a bottom plate 250 (shown in FIG. 11) of the housing 100 utilizing bolts 150, 152, 154, 156 and corresponding nuts disposed thereon. The bolts 150, 152, 154, 156 extend through washers (not shown) which are disposed on a top surface of the bottom plate 250, and the bottom plate 250, and a portion of the lower housing 60. Corresponding nuts are coupled to the bolts 150-156 proximate to a bottom surface of the lower housing 60. When the upper housing 62 is coupled to the lower housing 60, the battery modules 40, 42 are electrically coupled together. Alternately, when the upper housing 62 is de-coupled from the lower housing 60, the battery modules 40, 42 are electrically de-coupled from one another.

Referring to FIGS. 1, 4-6 and 17, the fuse lock-out assembly 50 utilizes a slidable door 120 that prevents access to fuse compartments in the fuse holding housing 102 (shown in FIG. 17) unless the manual service disconnect upper housing 60 is de-coupled from the manual service disconnect lower housing 62. The fuse lock-out assembly 50 includes a housing 100, the fuse holding housing 102, a guide plate 110, the slidable door 120, a bracket 130, a gasket 142, bolts 150, 152, 154, 156 and bolts 160, 162, 164, 166.

Figure 4:
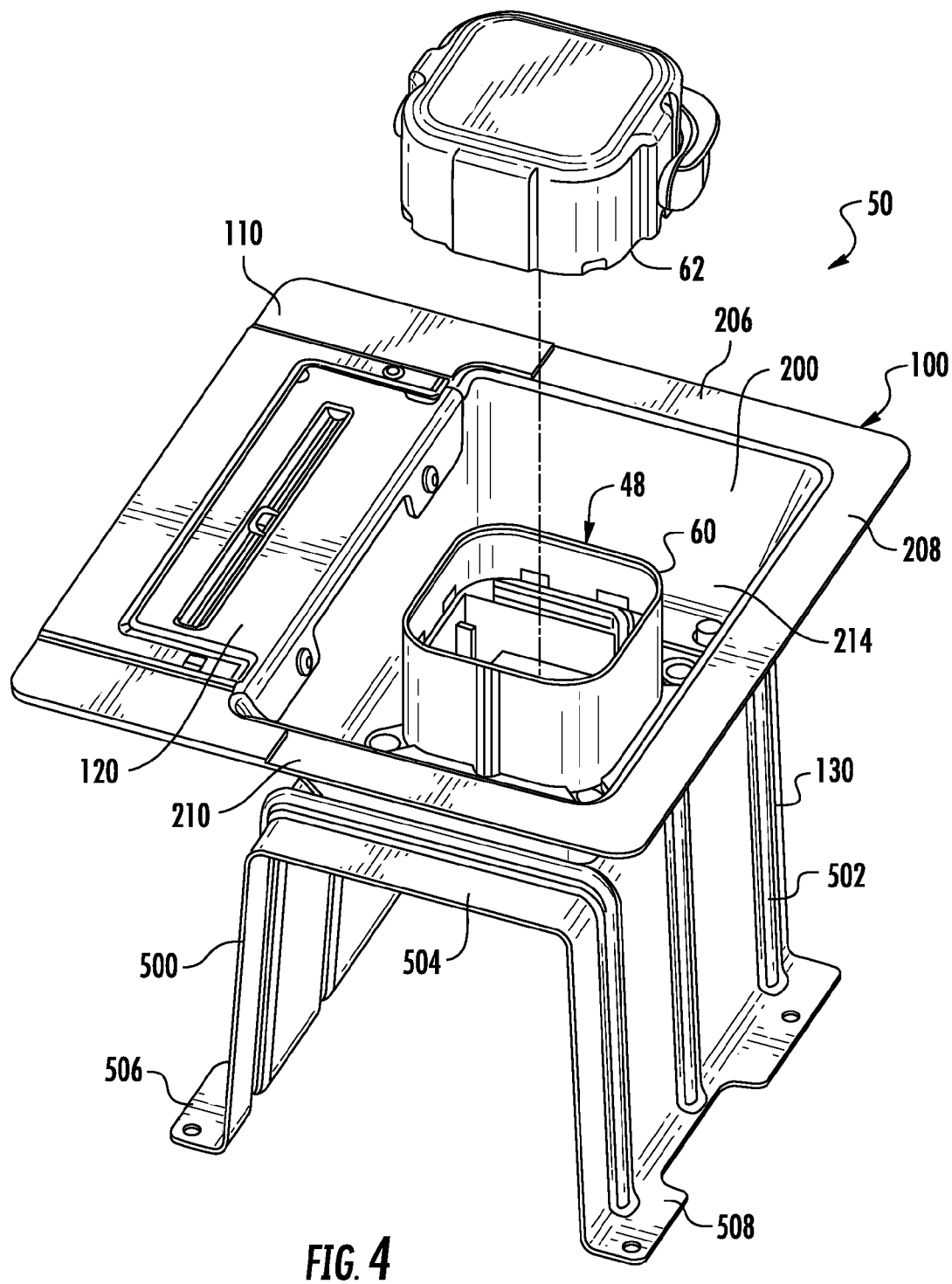
FIG. 4 is a schematic of the fuse lock-out assembly of FIG. 2 having a manual service disconnect upper housing de-coupled therefrom, and having a slidable door in a first operational position covering fuse compartments.
Figure 5:
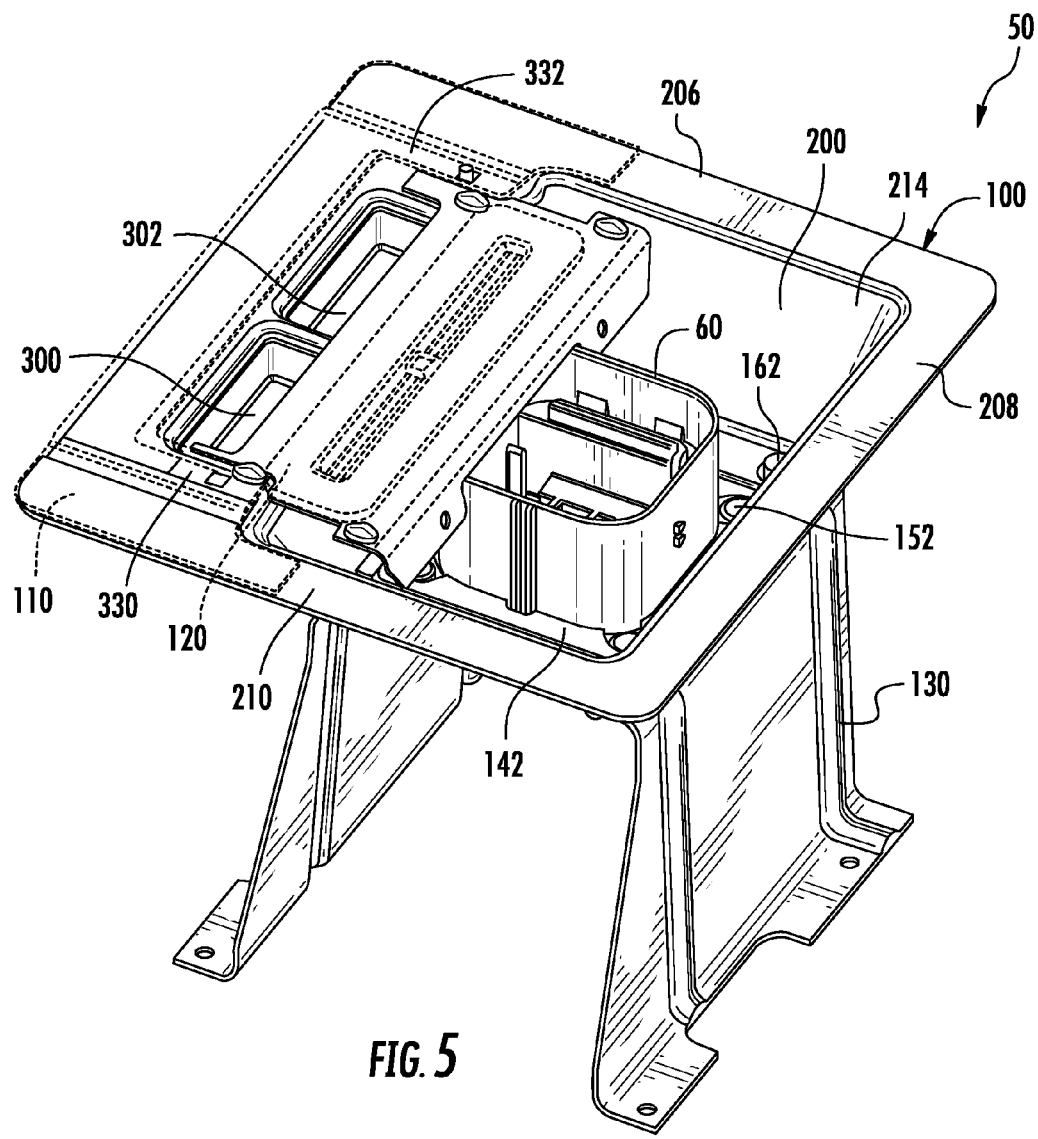
FIG. 5 is another schematic of the fuse-lock-out assembly of FIG. 2 having the slidable door in a second operational position in which fuse compartments are accessible.
Figure 11:
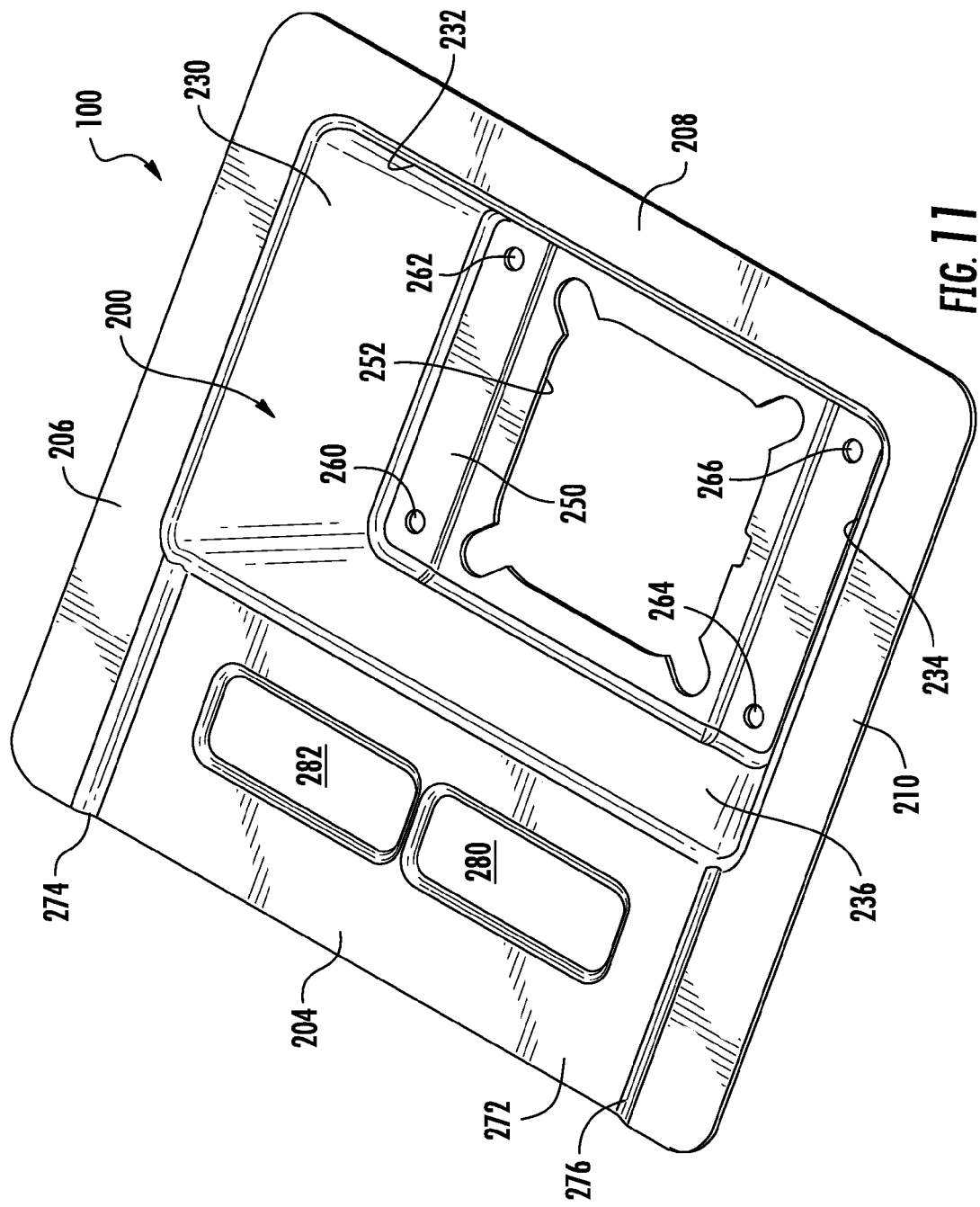
FIG. 11 is a schematic of a housing utilized in the fuse lock-out assembly of FIG. 2.

Referring to FIGS. 4, 5 and 11, the housing 100 is configured to hold the manual service disconnect 48 therein. The housing 100 is further configured to hold the fuse holding housing 102, the guide plate 110, and the slidable door 120 thereon. The housing 100 includes a tub portion 200, a plate portion 204, and flange portions 206, 208, 210.

Figure 6:
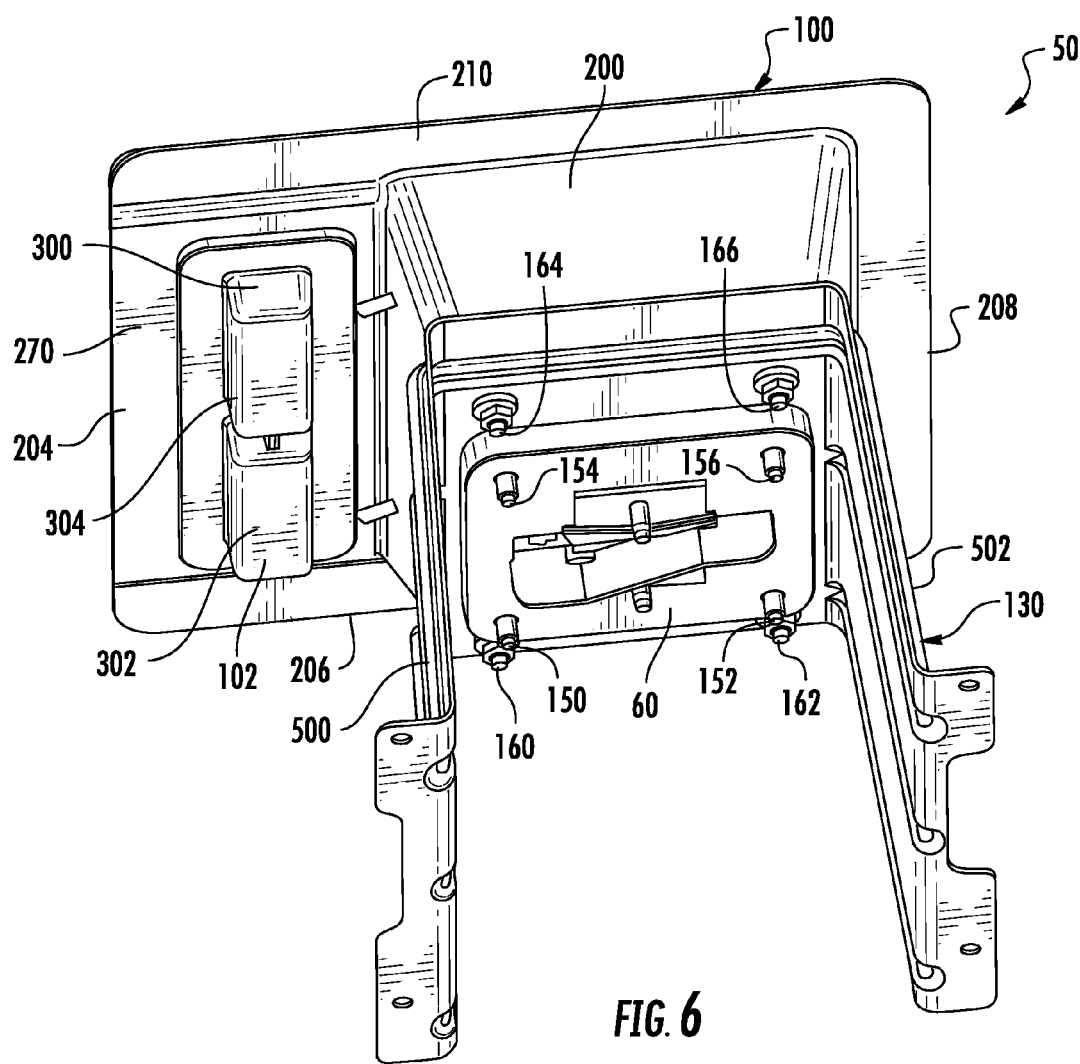
FIG. 6 is another schematic of the fuse-lock-out assembly of FIG. 2.

The tub portion 200 defines an interior region 214 (shown in FIG. 5) configured to hold the manual service disconnect lower housing 60 and the manual service disconnect upper housing 62 therein. The tub portion 200 has side walls 230, 232, 234, 236 and a bottom plate 250 coupled to the side walls 230, 232, 234, 236. The tub portion 200 has an open end opposite to the bottom plate 250. The bottom plate 250 has a central aperture 252 extending therethrough configured to receive a portion of the manual service disconnect lower housing 60 therethrough. Referring to FIGS. 6 and 11, the bottom plate further includes apertures 260, 262, 264, 266 extending therethrough that are configured to receive the bolts 160, 162, 164, 166 therethrough, respectively.

The plate portion 204 extends outwardly from a peripheral edge of the tub portion 200 proximate to an open end of the tub portion 200. The plate portion 204 has a first side 270 and a second side 272 and has apertures 280, 282 extending therethrough. The apertures 280, 282 communicate with the fuse compartments 300, 302 of the fuse holding housing 102.

Referring to FIGS. 2 and 11, the flange portion 206 extends outwardly from an edge 274 of the plate portion 204, and further extends from the side wall 230 of the tub portion 200. The flange portion 208 extends outwardly from the side wall 232 of the tub portion 200. The flange portion 210 extends outwardly from an edge 276 of the plate portion 204, and further extends from the side wall 234 of the tub portion 200. The flange portions 206, 208, 210 are coupled to a top surface of the upper housing portion 30.

Figure 12:
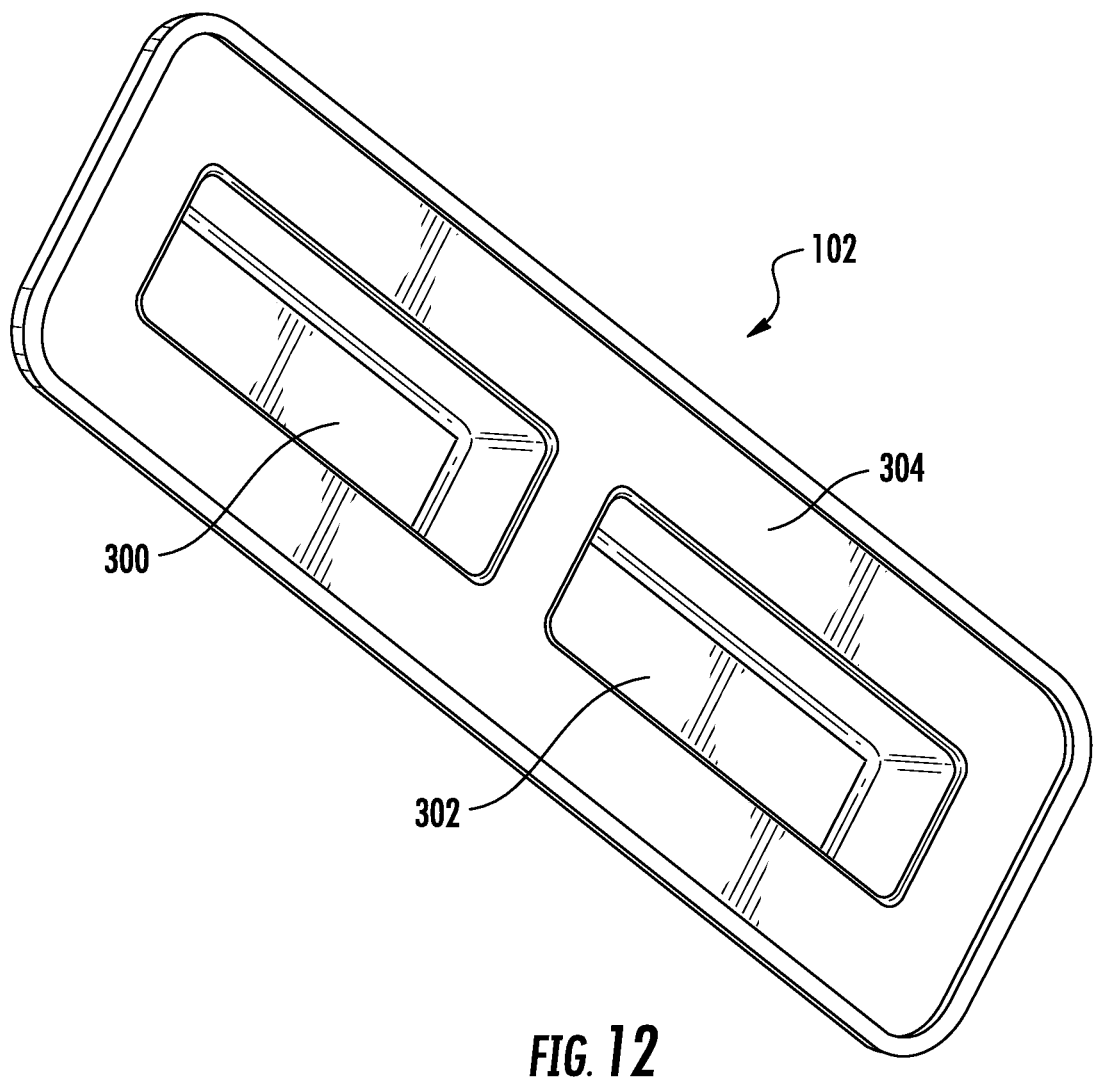
FIG. 12 is a schematic of a fuse holding housing utilized in the fuse lock-out assembly of FIG. 2.

Referring to FIGS. 1, 4-6 and 12, the fuse holding housing 102 is configured to hold the fuses 104, 106 therein. The fuse holding housing 102 includes fuse compartments 300, 302 (shown in FIG. 5) and a peripheral flange 304 extending around a periphery of open ends of the fuse compartments 300, 302. The fuse compartments 300, 302 are configured to hold the fuses 104, 106, respectively, therein and are disposed between the guide portions 330, 332 of the guide plate 110. The fuse compartment 300 may include first and second electrical adapters that are coupled to ends of the fuse 104. Further, the fuse compartment 302 may include first and second electrical adapters that are coupled to ends of the fuse 106. Further, in the fuse compartment 300, electrical cables may extend from the first and second electrical adapters through apertures in the fuse compartment 300. Also, in the fuse compartment 302, electrical cables may extend from the first and second electrical adapters through apertures in the fuse compartment 302. Referring to FIG. 6, the peripheral flange 304 is coupled to the second side 272 of the housing 100. Referring to FIGS. 11 and 12, the fuse compartment 300 communicates with the aperture 280 in the plate portion 204 of the housing 100. Further, the fuse compartment 302 communicates with the aperture 282 in the plate portion 204 of the housing 100. In one exemplary embodiment, the fuse holding housing 102 is constructed of plastic. Of course, in an alternative embodiment, the fuse holding housing 102 could be constructed of other materials.

Referring to FIGS. 5, 13, 14, 18 and 19, the guide plate 110 is configured to guide movement of the slidable door 120 relative to the housing 100. The guide plate 110 includes guide portions 330, 332, and flange portions 340, 342, 344. The guide portions 330, 332 extend substantially parallel to one another. The flange portion 342 extends between the end portions of the guide portions 330, 332. The flange portion 340 is coupled to the guide portion 330 and extends generally parallel to the guide portion 330. The flange portion 344 is coupled to the guide portion 332 and extends generally parallel to the guide portion 332. The flange portions 340, 342, 344 are coupled to the plate portion 204 of the housing 100. In one exemplary embodiment, the guide plate 110 is constructed of steel. Of course, in an alternative embodiment, the guide plate 110 could be constructed of other materials, such as plastic of aluminum for example.

Figure 13:
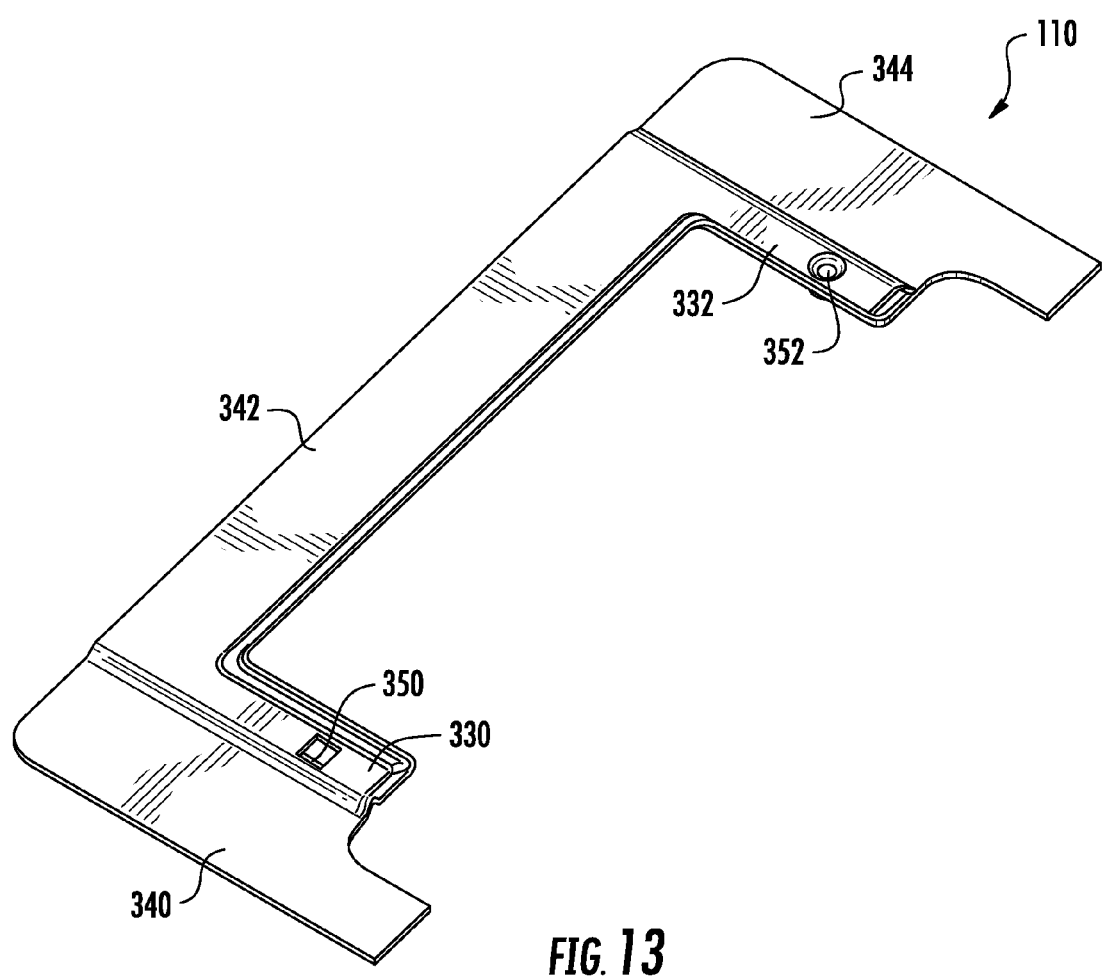
FIG. 13 is a schematic of a guide plate utilized in the fuse lock-out assembly of FIG. 2.
Figure 14:
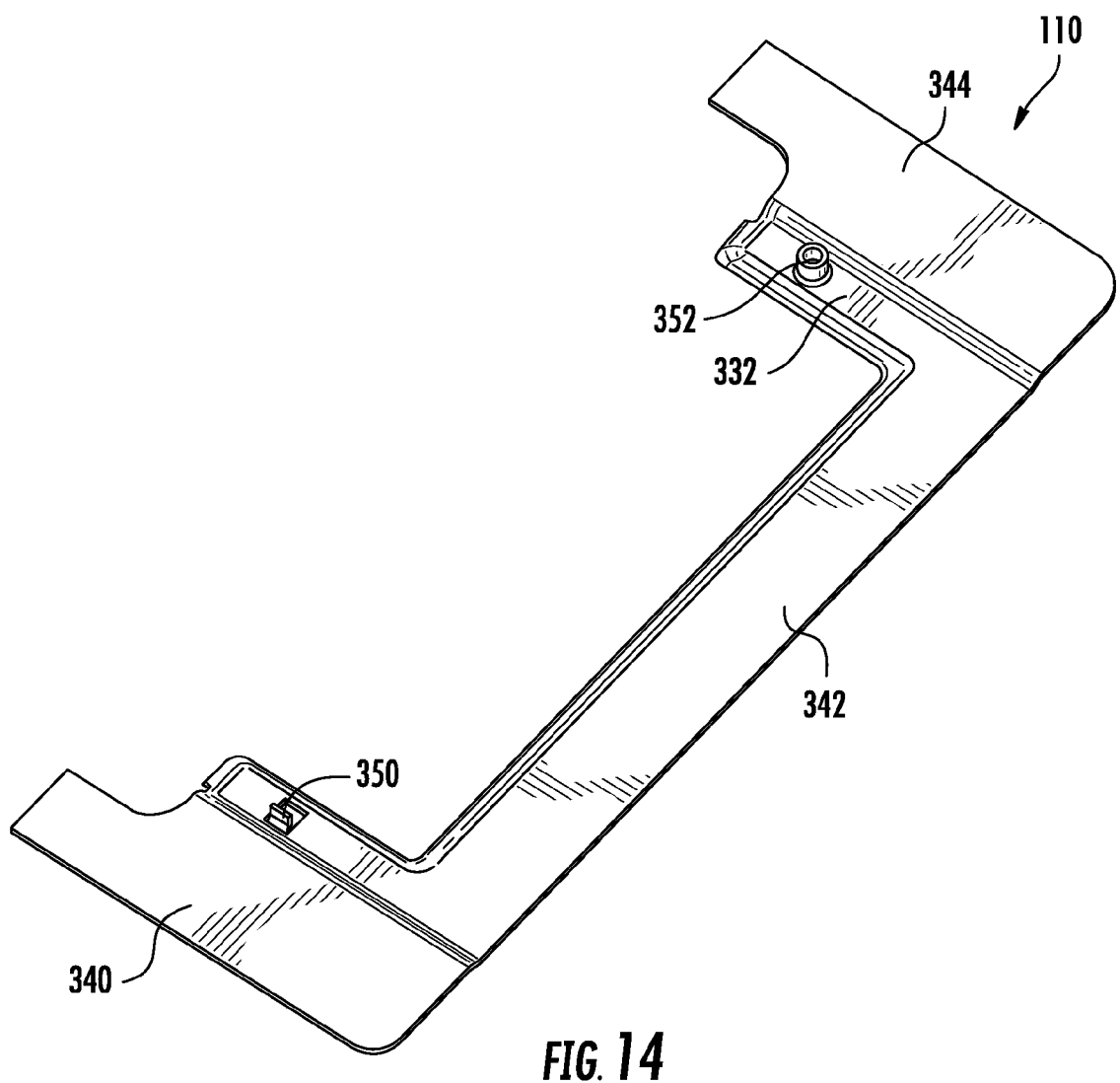
FIG. 14 is another schematic of the guide plate of FIG. 13.
Figure 17:
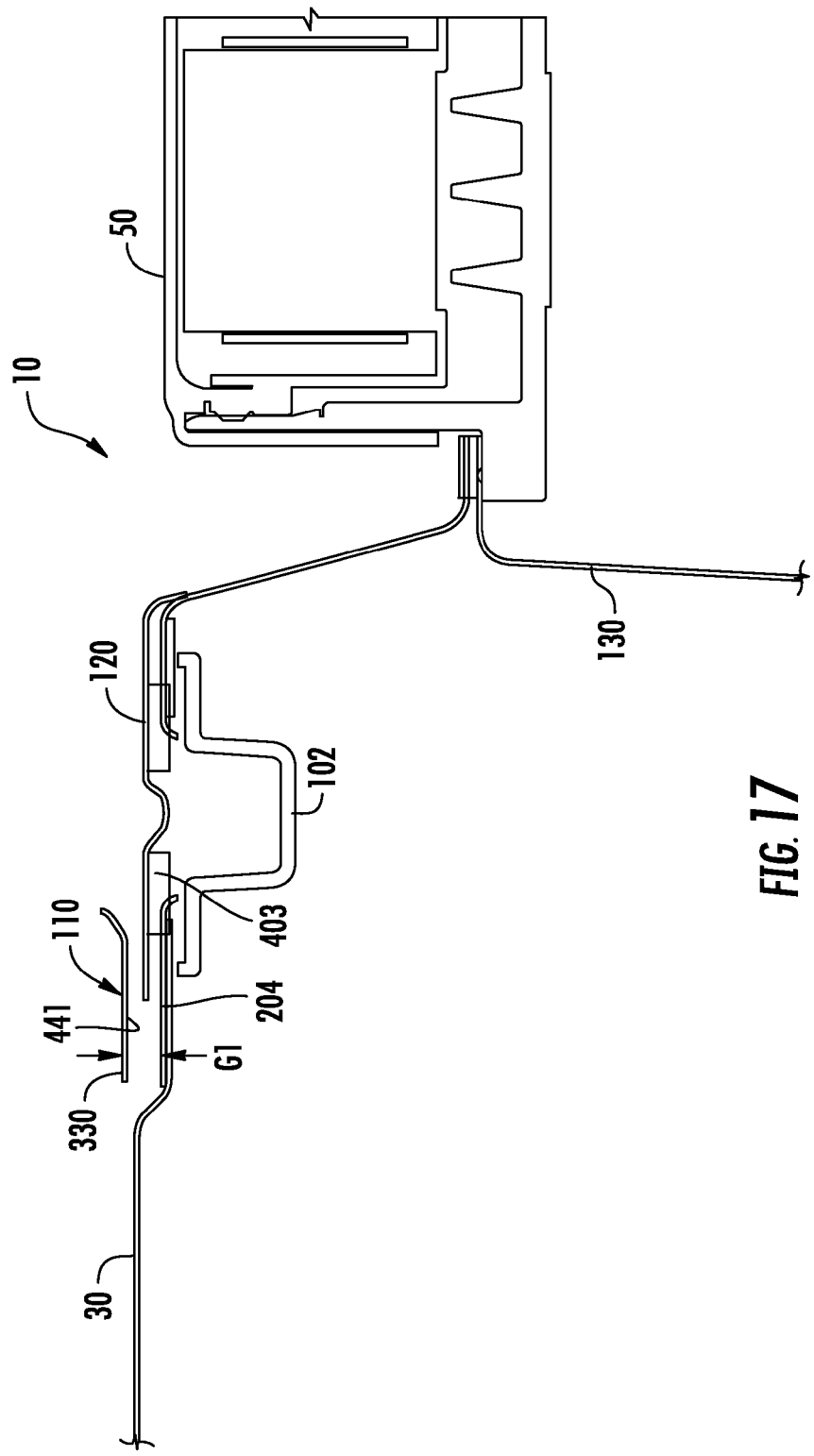
FIG. 17 is a cross-sectional schematic of a portion of the fuse lock-out assembly of FIG. 2.
Figure 18:
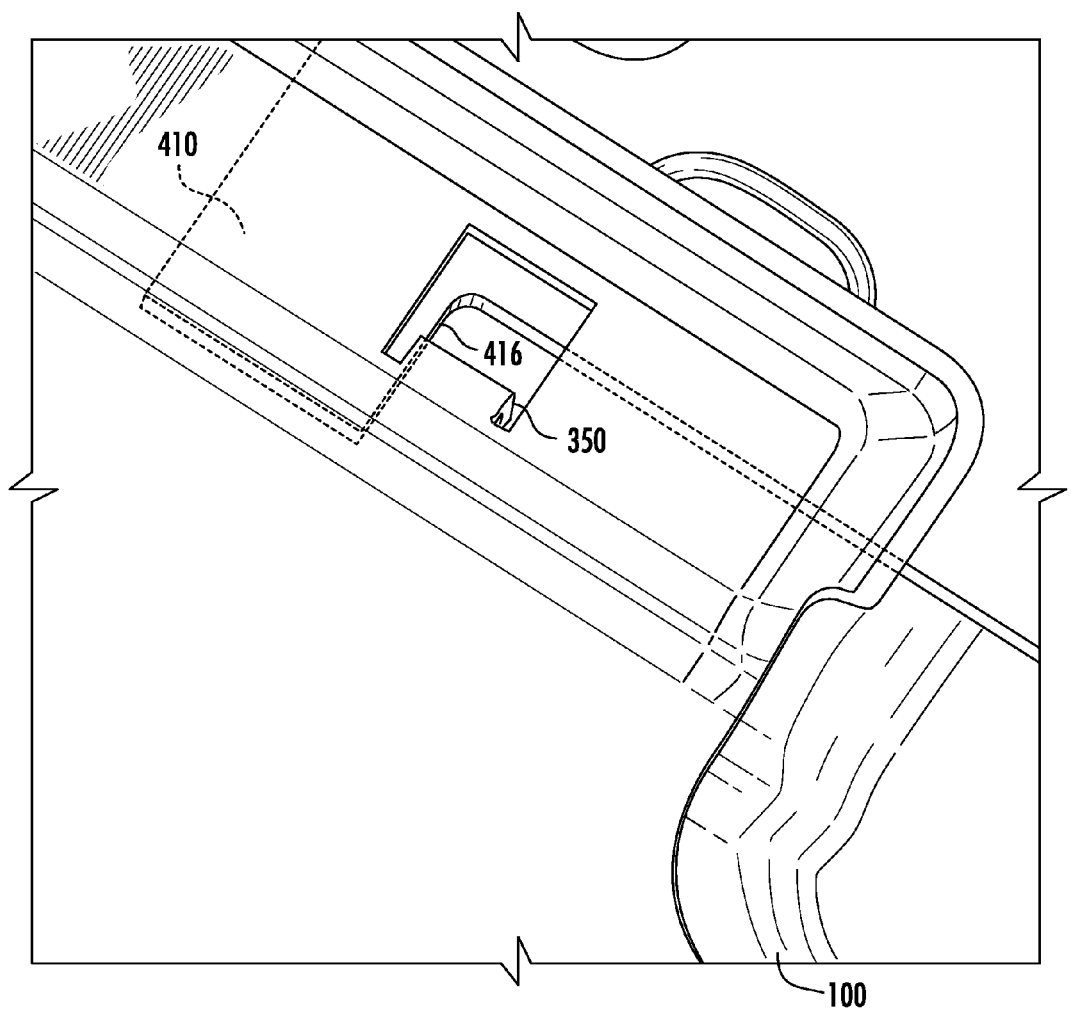
FIG. 18 is an enlarged schematic of a portion of the fuse lock-out assembly of FIG. 2 having a first stopping member configured to stop movement of the slidable door at the second operational position.

Referring to FIGS. 13, 14 and 17, the guide portion 330 and the plate portion 204 of the housing 100 define a gap G1 therebetween. The gap G1 is configured to receive a portion of the slidable door 120 therein. The guide portion 330 includes a stopping member 350 that extends into the gap G1. When the slidable door 120 is at the second operational position (shown in FIG. 5) and the fuses 104, 106 are accessible to an operator, the stopping member 350 abuts against a stopping surface 416 (shown in FIGS. 18 and 25) of an edge portion 410 of the slidable door 120. The stopping member 350 prevents the slidable door 120 from being slidably removed from the fuse lock-out assembly 50. Alternately, when the slidable door 120 is at the first operational position (shown in FIG. 4) and the fuses 104, 106 are not accessible to an operator, the stopping member 350 abuts against a stopping surface 417 (shown in FIG. 15) of an edge portion 412 of the slidable door 120.

The guide portion 332 and the plate portion 204 of the housing 100 define a gap therebetween. The gap between the guide portion 332 and the plate portion 204 is configured to receive a portion of the slidable door 120 therein. The guide portion 332 includes a stopping member 352 that extends into the gap. When the slidable door 120 is at the second operational position and the fuses 104, 106 are accessible to an operator, the stopping member 352 abuts against a stopping surface 426 (shown in FIGS. 15 and 19) of an edge portion 420 of the slidable door 120. The stopping member 350 prevents the slidable door 120 from being slidably removed from the fuse lock-out assembly 50. Alternately, when the slidable door 120 is at the first operational position and the fuses 104, 106 are not accessible to an operator, the stopping member 352 abuts against a stopping surface 427 (shown in FIG. 15) of an edge portion 422 of the slidable door 120.

Referring to FIGS. 15-19, the slidable door 120 is at least partially disposed within the gap G1 and the gap between the guide portion 332 and the plate portion 204. The slidable door 120 is configured to slide from a first operational position (shown in FIG. 4) to a second operational position (shown in FIG. 5) and vice versa. The slidable door 120 is configured to cover an open end of the fuse compartments 300, 302 at the first operational position to prevent the fuses 104, 106 from being removed from the fuse compartments 300, 302, respectively. The slidable door 120 is further configured to extend over a portion of the manual service disconnect lower housing 60 at the second operational position only if the manual service disconnect upper housing 62 is previously de-coupled from the manual service disconnect lower housing 60. The slidable door 120 is further configured to not cover the open end of the fuse compartments 300, 302 at the second operational position such that the fuses 104, 106 are accessible to an operator. In other words, the slidable door 120 is configured to allow an operator to access the fuses 104, 106 only when the manual service disconnect upper housing 62 is removed from the fuse lockout assembly 50 and the slidable door 120 is at the second operational position.

When the slidable door 120 is slid from the first operational position at least partially into the interior region 214, the slidable door 120 is configured to abut against the manual service disconnect upper housing 62 if the manual service disconnect upper housing 162 is coupled to the manual service disconnect lower housing 160 in the interior region 214, such that the slidable door 120 cannot extend to the second operational position. Further, the slidable door 120 at least partially covers the open end of the fuse compartments 300, 302 when the slidable door 120 is disposed between the first and second operational positions such that the fuses 104, 106 are not accessible by an operator. Also, the slidable door 120 at the first operational position does not interfere with the manual service disconnect upper housing 62 being de-coupled from the manual service disconnect lower housing 60 in the interior region 214.

The slidable door 120 has a plate portion 400, a plate portion 402, and a gasket 403. The plate portion 402 extends from an end of the plate portion 400 and is substantially perpendicular to the plate portion 400. The plate portion 400 has a first side 405 and a second side 406. The plate portion 400 further includes edge portions 410, 412 and a groove 414 extending between the edge portions 410, 412. The plate portion 400 further includes edge portions 420, 422 and a groove 424 extending between the end portions 420, 422. The plate portion 400 further includes raised portions 430, 432, 434, 436 extending upwardly from the second side 406, and a top indentation 440 extending downwardly from the first side 405. The gasket 403 is coupled to the first side 405 and is generally rectangular ring-shaped. The gasket 403 has a central opening that receives the top indentation 440 therein. The gasket 403 is configured to contact the plate portion 204 of the housing 100 around the open ends of the fuse compartments 300, 302 when the slidable door 120 is at the first operational position to provide a fluid-tight seal around the open ends of the fuse compartments 300, 302. The gasket 403 is constructed of an elastomeric material.

The edge portions 410, 412 of the slidable door 120 are slidably received within the gap G1 between the plate portion 204 and the guide portion 330. Also, the edge portions 420, 422 are received within a gap between the plate portion 204 and the guide portion 332.

The edge portion 410 includes a stopping surface 416 configured to abut against the stopping member 350 (shown in FIG. 13) when the slidable door 120 is at the second operational position. Further, the edge portion 412 includes a stopping surface 417 configured to abut against the stopping member 350 when the slidable door 120 is at the first operational position.

The edge portion 420 includes a stopping surface 426 configured to abut against the stopping member 352 (shown in FIG. 13) when the slidable door 120 is at the second operational position. Further, the edge portion 422 includes a stopping surface 427 configured to abut against the stopping member 352 when the slidable door 120 is at the first operational position.

The raised portions 430, 432, 434, 436 are configured to contact a bottom surface 441 (shown in FIG. 17) of the guide plate 110. The raised portions 430, 432, 434, 436 urge the gasket 403 of the slidable door 120 downwardly to seal against the plate portion 204 of the housing 100 when the slidable door 120 is at the first operational position. The top indentation 440 extends longitudinally across the slidable door 120 and provides additional rigidity to the slidable door 120.

Figure 7:
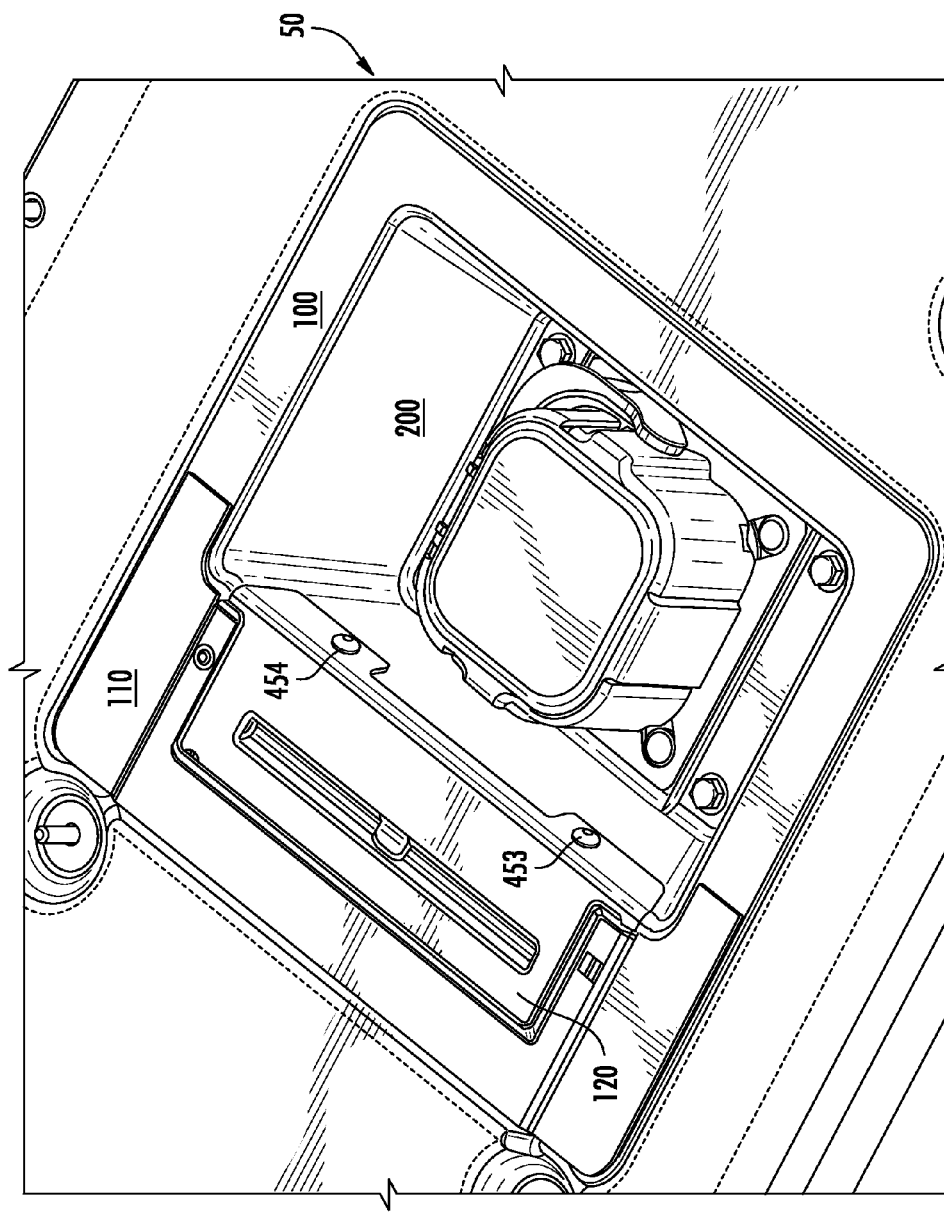
FIG. 7 is an enlarged schematic of a portion of the fuse-lock-out assembly of FIG. 2 having a slidable door in a first operational position covering fuse compartments.
Figure 8:
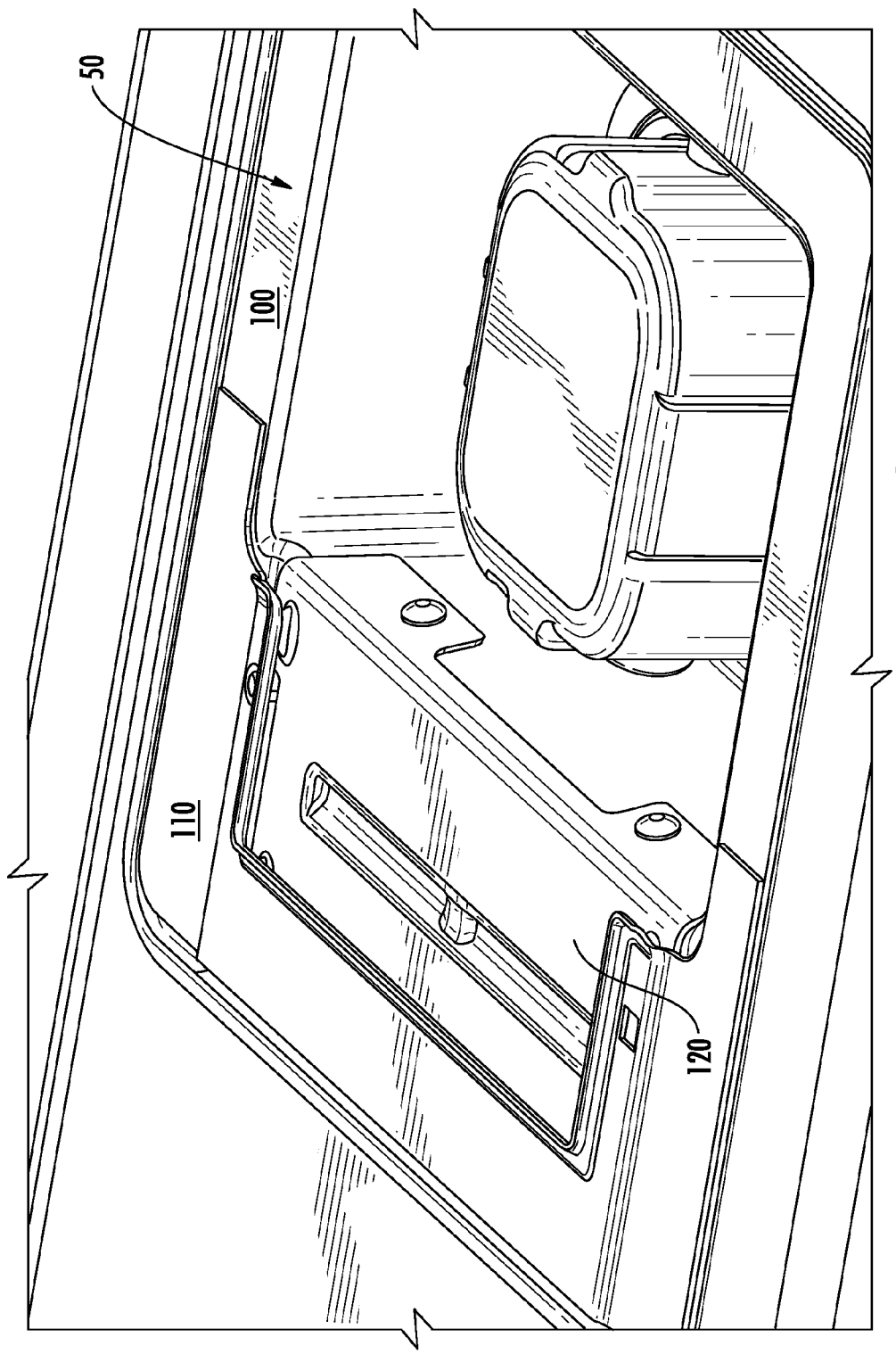
FIG. 8 is another enlarged schematic of a portion of the fuse-lock-out assembly of FIG. 2 having a slidable door in a first operational position covering fuse compartments.
Figure 9:
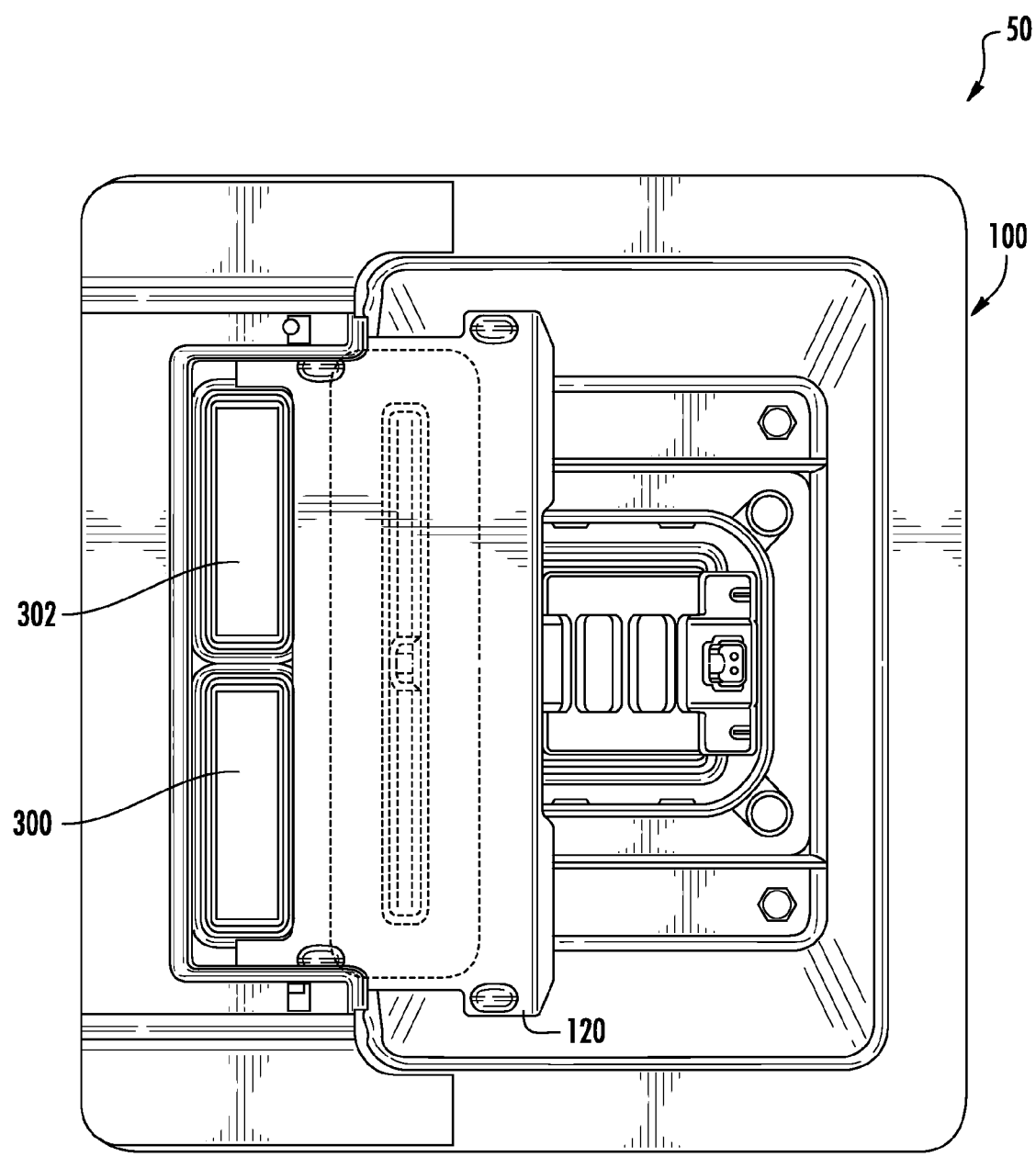
FIG. 9 is a top view of the fuse lock-out assembly of FIG. 2 having the sliding door in the second operational position in which the fuse compartments are accessible.
Figure 10:
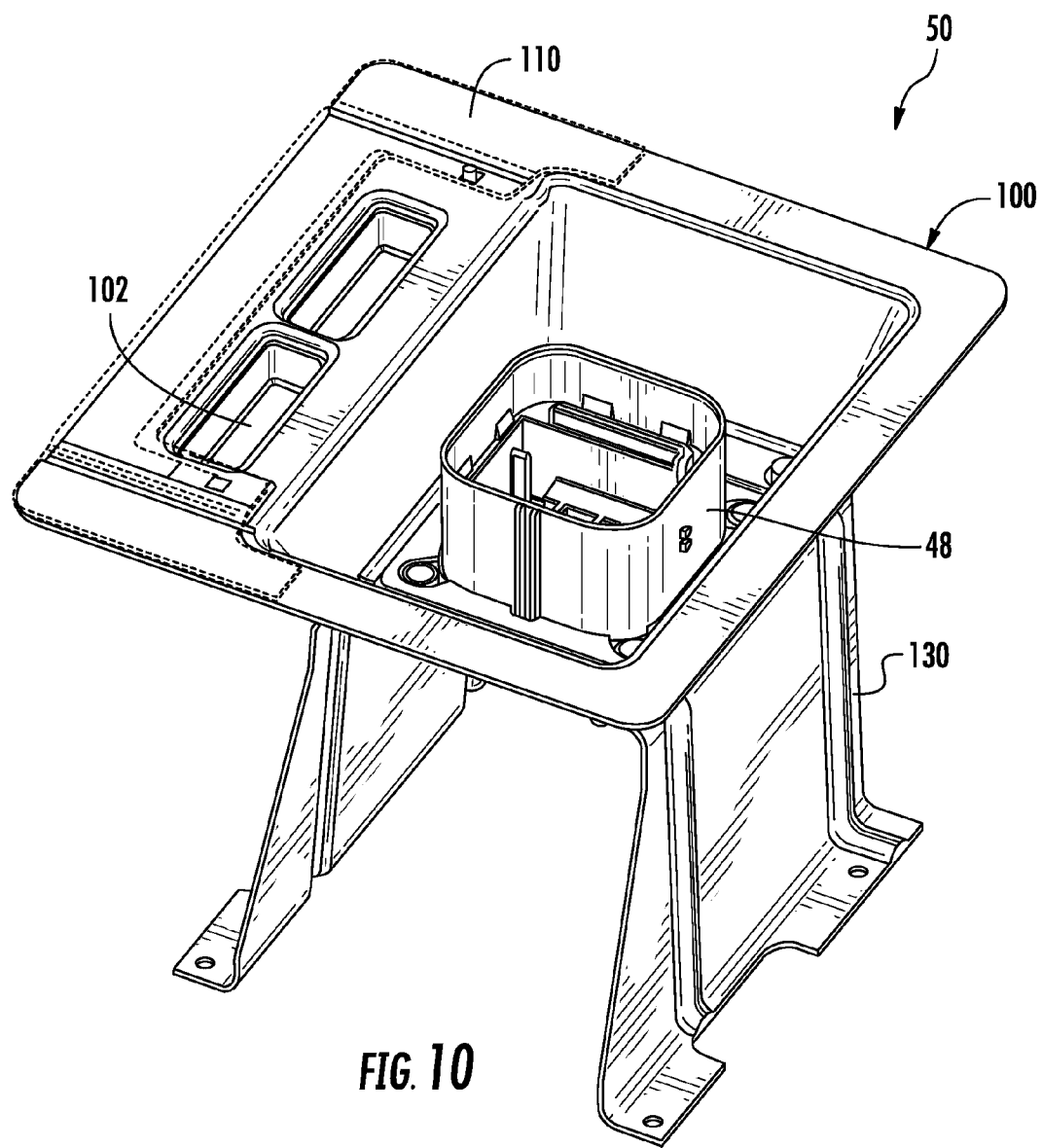
FIG. 10 is a schematic of the fuse lock-out assembly of FIG. 2 without the slidable door being shown.
Figure 15:
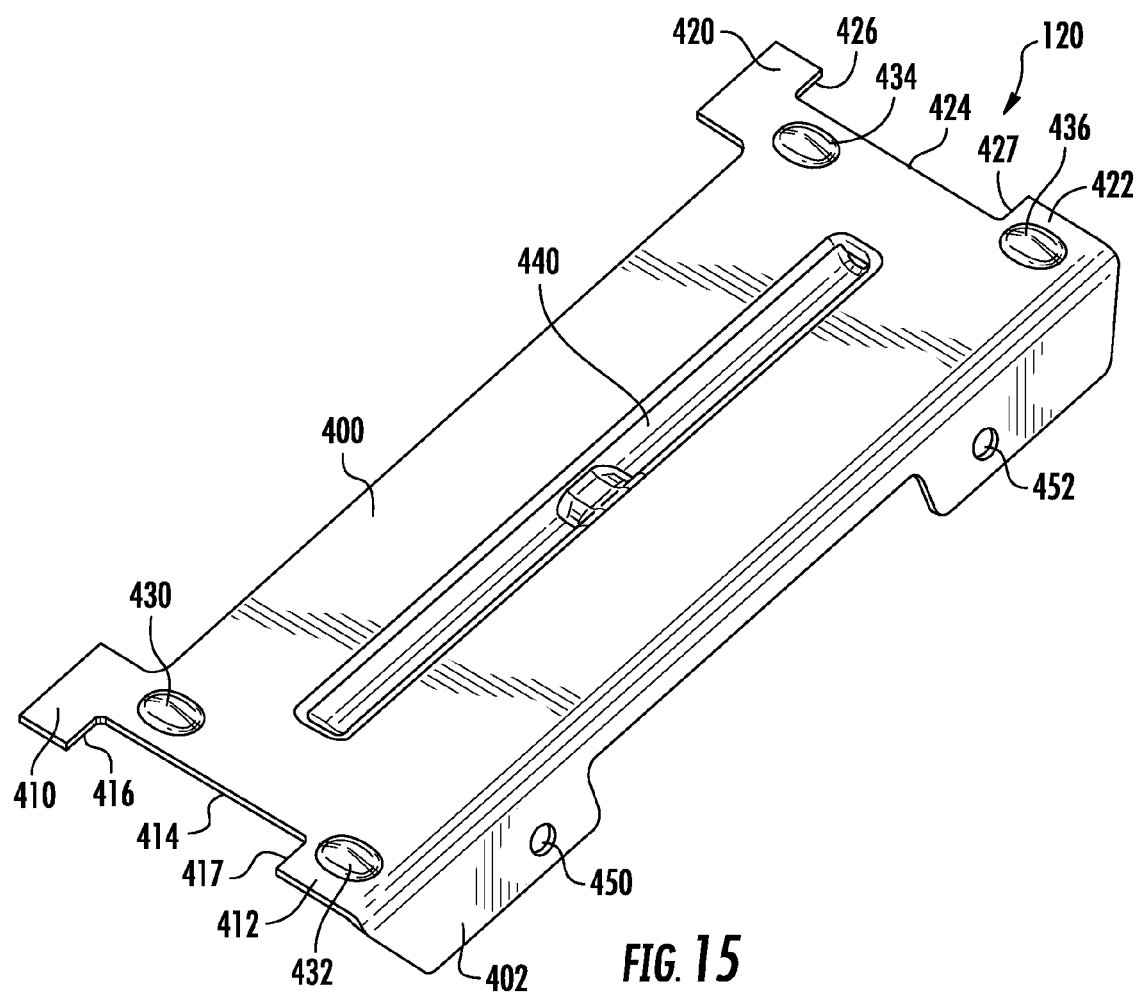
FIG. 15 is a schematic of a slidable door utilized in the fuse lock-out assembly of FIG. 2.
Figure 16:
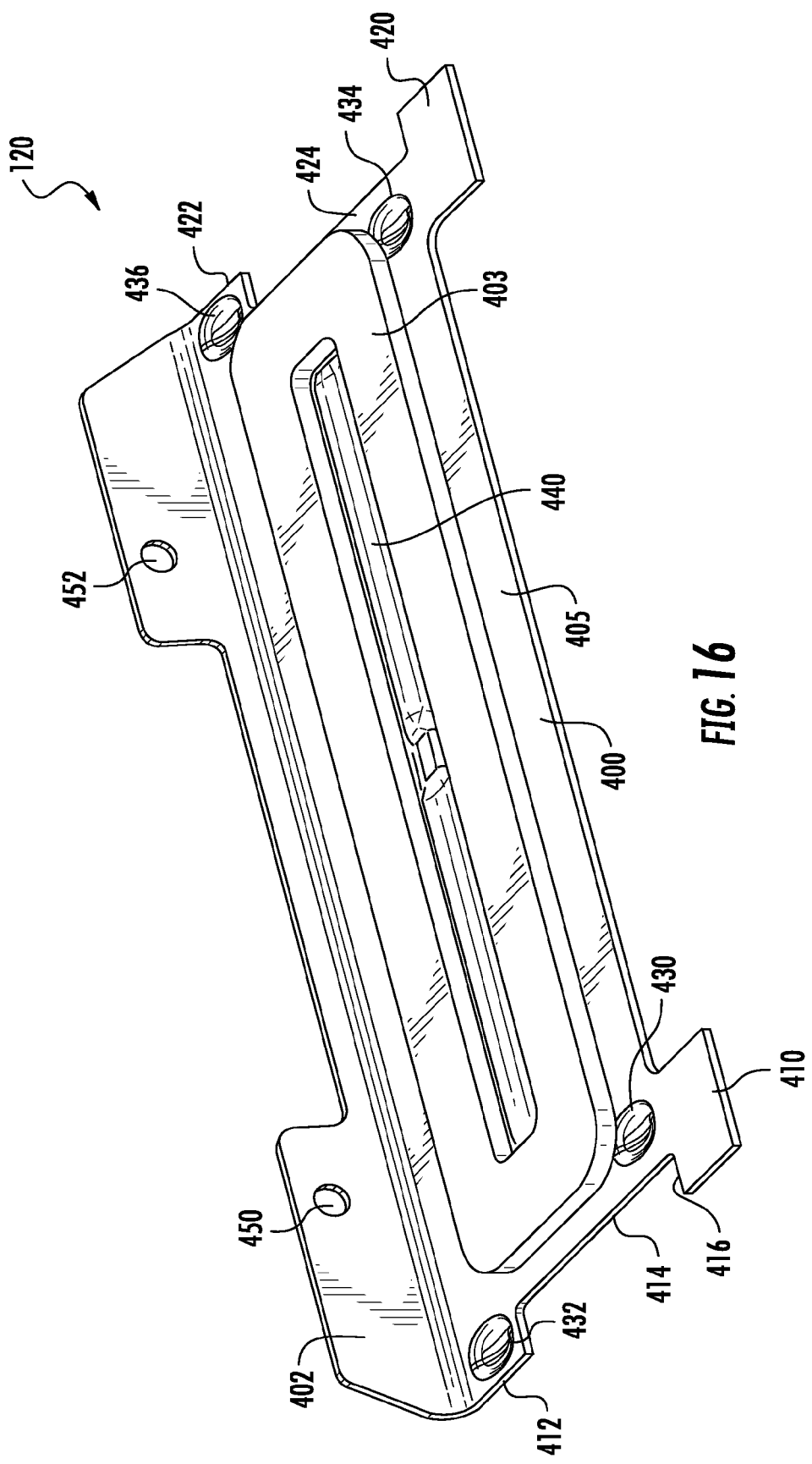
FIG. 16 is another schematic of the slidable door of FIG. 15.

Referring to FIGS. 7 and 15, the plate portion 402 include apertures 450, 452 extending therethrough for receiving bolts 453, 454, respectively, therethrough. The bolts 453, 454 are configured to couple the slidable door 120 to the tub portion 200 at the first operational position. It should be noted that the bolts 453, 454 are removed from the apertures 450, 452 allow an operator to move the slidable door 120 from the first operational position to the second operational position.

Referring to FIGS. 3, 4, 6 and 11, the mounting bracket 130 is coupled to the bottom plate 250 of the tub portion 200, and is further coupled to the lower housing portion 20. The mounting bracket includes leg portions 500, 502, a plate portion 504, and flange portions 506, 508. The leg portions 500, 502 extend downwardly from opposite ends of the plate portion 504. The flange portion 506 extends outwardly from the leg portion 500 and is configured to be coupled to the lower housing portion 20. Also, the flange portion 508 extends outwardly from the leg portion 502 and is configured to be coupled to the lower housing portion 20. The plate portion 504 includes apertures extending therethrough for receiving the bolts 150, 152, 154, 156, 160, 162, 164, 166 therethrough. The bolts 160, 162, 164, 166 are configured to couple the plate portion 504 to the bottom plate 250 of the tub portion 200. In one exemplary embodiment, the mounting bracket 130 is constructed of steel. Of course, in an alternative embodiment, the mounting bracket 130 could be constructed of another material, such as plastic or aluminum for example.

The fuse lock-out assembly provides a substantial advantage over other assemblies. In particular, fuse lock-out assembly 50 provides a technical advantage of utilizing with the slidable door 120 that prevents access to fuse compartments unless a lower housing 60 of the manual service disconnect 48 is removed from the fuse lock-out assembly 50.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A fuse lock-out assembly for a battery pack, comprising:
a first housing having an interior region that holds a manual service disconnect lower housing and a manual service disconnect upper housing therein;
a fuse holding housing coupled to the first housing, the fuse holding housing having a first fuse compartment that holds a first fuse therein;
a slidable door being slidably coupled to the first housing, the slidable door slides from a first operational position to a second operational position;
the slidable door covers an open end of the first fuse compartment at the first operational position to prevent the first fuse from being removed from the first fuse compartment; and
the slidable door extends over a portion of the manual service disconnect lower housing at the second operational position only if the manual service disconnect upper housing is previously de-coupled from the manual service disconnect lower housing, the slidable door further does not cover the open end of the first fuse compartment at the second operational position.

2. The fuse lock-out assembly of claim 1, wherein the slidable door at the first operational position does not interfere with the manual service disconnect upper housing being de-coupled from the manual service disconnect lower housing in the interior region.

3. The fuse lock-out assembly of claim 1, wherein when the slidable door slides from the first operational position at least partially into the interior region, the slidable door abuts against the manual service disconnect upper housing if the manual service disconnect upper housing is coupled to the manual service disconnect lower housing in the interior region, such that the slidable door cannot extend to the second operational position.

4. The fuse lock-out assembly of claim 3, wherein the slidable door at least partially covers the open end of the first fuse compartment when the slidable door is disposed between the first and second operational positions such that the first fuse is not accessible.

5. The fuse lock-out assembly of claim 1, wherein the first housing has a tub portion and a plate portion, the plate portion extending outwardly from a peripheral edge of the tub portion proximate to an open end of the tub portion, the tub portion defining the interior region that holds the manual service disconnect lower housing and the manual service disconnect upper housing therein, the plate portion having a first side and a second side and having a first aperture extending therethrough.

6. The fuse lock-out assembly of claim 5, further comprising a mounting bracket coupled to a bottom plate of the tub portion.

7. The fuse lock-out assembly of claim 5, wherein a width of the slidable door is less than a width of the interior region of the tub portion.

8. The fuse lock-out assembly of claim 5, wherein the fuse holding housing is coupled to the second side of the plate portion of the first housing, the fuse holding housing having the first fuse compartment communicating with the first aperture in the plate portion of the first housing.

9. The fuse lock-out assembly of claim 8, further comprising a guide plate coupled to the first side of the plate portion of the first housing, the guide plate having first and second guide portions, the first fuse compartment being disposed between the first and second guide portions, the first guide portion and the plate portion having a first gap therebetween, the second guide portion and the plate portion having a second gap therebetween.

10. The fuse lock-out assembly of claim 9, wherein the slidable door is at least partially disposed within the first and second gaps.

11. The fuse lock-out assembly of claim 9, wherein the fuse holding housing further includes a second fuse compartment that holds a second fuse therein and is disposed between the first and second guide portions, the plate portion further having a second aperture extending therethrough, the second fuse compartment communicating with the second aperture; and
the slidable door further covers an open end of the second fuse compartment at the first operational position to prevent the second fuse from being removed from the second fuse compartment.

12. The fuse lock-out assembly of claim 9, wherein the first guide portion has a first stopping member extending downwardly therefrom and into the first gap, the slidable door having a first edge portion that contacts the first stopping member when the slidable door is at the second operational position.

13. The fuse lock-out assembly of claim 12, wherein the first stopping member prevents the slidable door from being slidably removed from the fuse lock-out assembly.

14. The fuse lock-out assembly of claim 12, wherein the second guide portion has a second stopping member extending downwardly therefrom and into the second gap, the slidable door having a second edge portion that contacts the second stopping member when the slidable door is at the second operational position.

15. The fuse lock-out assembly of claim 1, wherein the manual service disconnect upper housing is removably coupled to the manual service disconnect lower housing.

\* \* \* \* \*